US006633233B1

United States Patent
Fries

(10) Patent No.: US 6,633,233 B1
(45) Date of Patent: Oct. 14, 2003

(54) ACCELERATION RATE METER

(75) Inventor: David P. Fries, St. Petersburg, FL (US)

(73) Assignee: University of Florida, Tampa, FL (US)

( * ) Notice: Subject to any disclaimer, the term of this patent is extended or adjusted under 35 U.S.C. 154(b) by 31 days.

(21) Appl. No.: 09/715,339

(22) Filed: Nov. 17, 2000

Related U.S. Application Data

(60) Provisional application No. 60/166,186, filed on Nov. 18, 1999.

(51) Int. Cl.$^7$ ............................................. G08B 21/00
(52) U.S. Cl. ..................... 340/669; 340/657; 340/660; 340/689; 340/815.71; 324/173; 324/174
(58) Field of Search ................. 340/669, 689, 340/657, 660, 815.71, 566, 567, 552, 553, 554, 555, 556, 11, 661, 662, 663; 324/173, 174

(56) References Cited

U.S. PATENT DOCUMENTS

| | | | |
|---|---|---|---|
| 3,739,158 A | * 6/1973 | Woodward | 318/635 |
| 3,899,779 A | * 8/1975 | Malozemoff | 365/2 |
| 3,996,571 A | * 12/1976 | Chang | 365/3 |
| 4,031,526 A | * 6/1977 | Archer et al. | 365/8 |
| 4,246,474 A | * 1/1981 | Lazzari | 235/450 |
| 4,326,188 A | * 4/1982 | Dahlberg | 338/325 |
| 4,629,982 A | * 12/1986 | Kieslich | 340/672 |
| 4,864,288 A | * 9/1989 | Cross | 340/669 |
| 5,675,459 A | * 10/1997 | Sato et al. | 360/325 |
| 5,729,137 A | * 3/1998 | Daughton et al. | 324/252 |
| 5,825,593 A | * 10/1998 | Mowry | 360/113 |
| 6,111,716 A | * 8/2000 | Ngo et al. | 360/67 |

OTHER PUBLICATIONS

Giant Magneto–Resistance Devices, authored by E. Hirota, H. Sakakima and K. Inomata, and published by Springer Series In Surface Sciences. (Book cover, title page, preface, table of contents and Section 4.3.1. (pp. 100–105) are enclosed.

* cited by examiner

Primary Examiner—Daniel J. Wu
Assistant Examiner—Daniel Previl
(74) Attorney, Agent, or Firm—Howard & Howard

(57) ABSTRACT

Each embodiment (10, 110 and 210) includes a magnetic element (12, 112 and 212) producing a magnetic field. In the first embodiment (10) of FIG. 1, the magnetic element (12) comprises a magnetic bit strip disposed extending in a circular arc on a fixed or stationary plate (14). In the second embodiment (110) of FIG. 2, the magnetic element (112) comprises a magnetic bit strip supported on a movable bar or rod (114). In the third embodiment (210) of FIG. 3, the magnetic element (212) comprises a magnetic bit strip disposed in a rectilinear path on a stationary plate (214). An electrical resistor (16, 116 and 216) is included for changing in electrical resistance in response to changes in the magnetic field produced by the magnetic element (12, 112 and 212). The resistor (16, 116 and 216) comprises a giant magnetoresistive sensor. A voltage sensor (18, 118 and 218) is included for sensing the voltage across the electrical resistor (16, 116 and 216), the sensors (18, 118 and 218) being connected to the resistors (16, 116 and 216) by electrical lead wires.

6 Claims, 1 Drawing Sheet

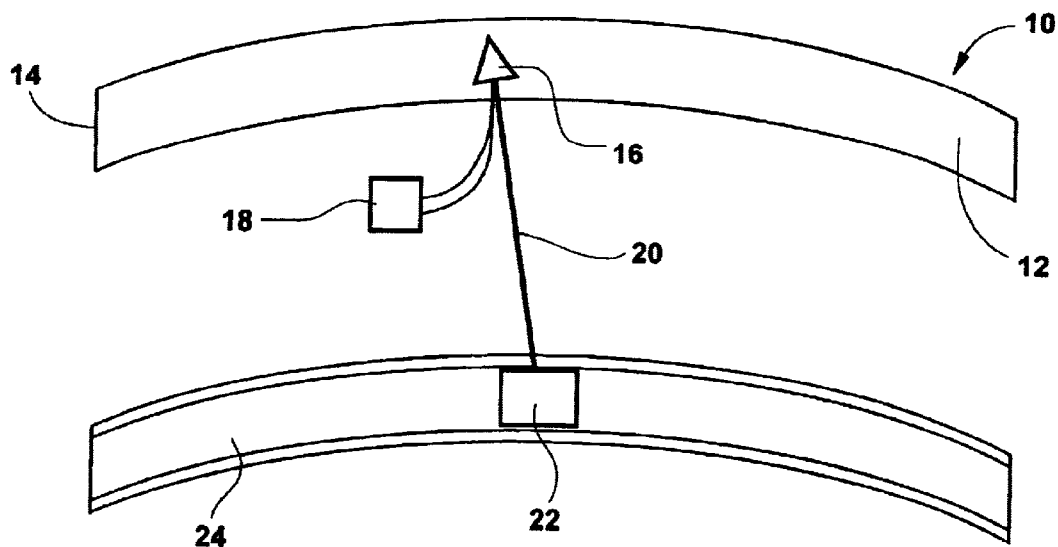
FIG - 1
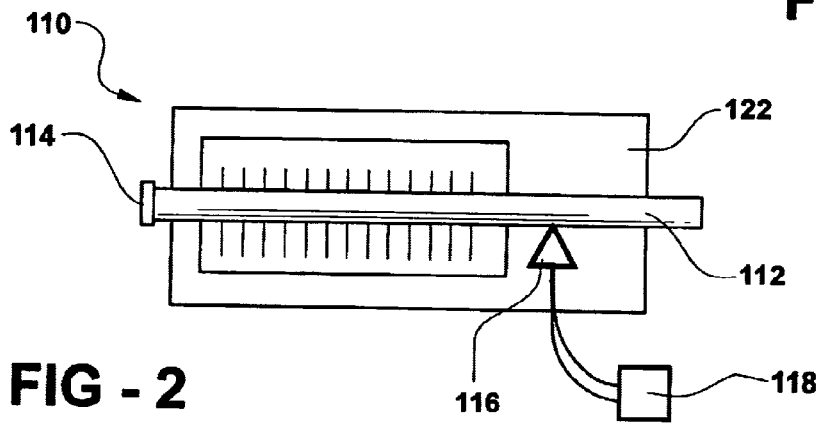
FIG - 2
FIG - 3
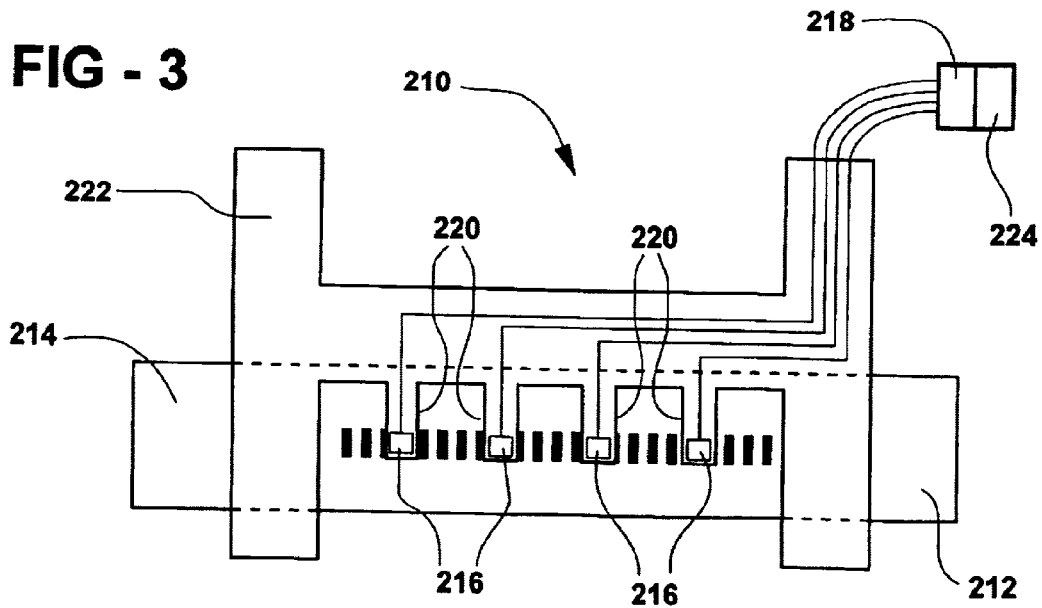

ACCELERATION RATE METER

RELATED APPLICATION

This application claims priority to and the benefits of co-pending provisional application No. 60/166,186 filed Nov. 18, 1999.

BACKGROUND OF THE INVENTION

1. Field of the Invention

The subject invention relates to sensor of the type for sensing acceleration.

2. Description of the Prior Art

The prior art is replete with accelerometers; however, there is a need for a sensitive acceleration rate sensor in a miniature format that is compatible with integrated circuit technology.

SUMMARY OF THE INVENTION AND ADVANTAGES

A motion detector comprising a magnetic element producing a magnetic field, a giant magnetoresistive sensor for changing in electrical resistance in response to changes in the magnetic field produced by the magnetic element, and a voltage sensor for sensing the voltage across the giant magnetoresistor sensor.

The invention also includes a method of detecting motion comprising the steps of producing a magnetic field, changing electrical resistance of the sensor in response to changes in the magnetic field, and measuring the voltage across the giant magnetoresistor sensor.

Accordingly, the subject invention provides a sensitive acceleration rate sensor in a miniature format that is compatible with integrated circuit technology.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1 is a schematic view of a first embodiment;

FIG. 2 is a schematic view of a second embodiment; and

FIG. 3 is a schematic view of a third embodiment.

DETAILED DESCRIPTION OF THE PREFERRED EMBODIMENT

Referring to the Figures, wherein like numerals removed from one another by a factor of one hundred indicate like or corresponding parts throughout the several views, a motion detector is generally shown at 10, 110 and 210.

Each embodiment 10, 110 and 210 includes a magnetic element 12, 112 and 212 producing a magnetic field. In the first embodiment 10 of FIG. 1, the magnetic element 12 comprises a magnetic bit strip disposed extending in a circular arc on a fixed or stationary plate 14. In the second embodiment 110 of FIG. 2, the magnetic element 112 comprises a magnetic bit strip supported on a movable bar or rod 114. In the third embodiment 210 of FIG. 3, the magnetic element 212 comprises a magnetic bit strip disposed in a rectilinear path on a stationary plate 214.

An electrical resistor 16, 116 and 216 is included for changing in electrical resistance in response to changes in the magnetic field produced by the magnetic element 12, 112 and 212. The resistor 16, 116 and 216 comprises a giant magnetoresistive sensor.

A voltage sensor 18, 118 and 218 is included for sensing the voltage across the electrical resistor 16, 116 and 216, the sensors 18, 118 and 218 being connected to the resistors 16, 116 and 216 by electrical lead wires.

In each embodiment, the electrical resistors 16, 116 and 216 are movable relative to the magnetic elements 12, 112 and 212. In the first embodiment 10 of FIG. 1, the resistor 16 is supported on a swinging lever 20 that is mounted to a proof mass 22, which, in turn, slides in an annular track 24. Accordingly, the electrical resistor 16 is supported for angular movement over the magnetic element 12. In the second embodiment 110 of FIG. 2, the resistor 116 is supported on a proof mass 122, with either the rod 114 supporting the magnetic bit strip 112 or the proof mass 122 being movable. In the third embodiment 210 of FIG. 3, a plurality of resistors 216 are supported on fingers 220 extending from the belly of an H-shaped proof mass 222. Each of these plurality of electrical resistors 216 senses changes in the magnetic field and the voltage is measured 218 across each resistor 216 and the voltages are averaged in a comparator 224. As will be appreciated, a proof mass 22, 122 and 222 is attached to each electrical resistor 16, 116 and 216 for reacting to applied forces caused by motion.

The invention also provides a method of detecting motion comprising the steps of producing a magnetic field 12, 112 and 212, changing electrical resistance 16, 116 and 216 in response to changes in the magnetic field, and measuring 18, 118 and 218 the voltage across the electrical resistance 16, 116 and 216. The electrical resistance 16, 116 and 216 is moved relative to the magnetic field 12, 112 and 212. In the first embodiment 10 of FIG. 1, the electrical resistance 16 is moved in an arc relative to the magnetic field 12. In the embodiments of FIGS. 2 and 3, the electrical resistances 116 and 216 are moved rectilinearly relative to the respective magnetic fields 112 and 212.

As alluded to above, a proof mass 22, 122 and 222 is attached to the respective electrical resistances 16, 116 and 216 so that each electrical resistance reacts to applied forces caused by motion.

In the case of FIG. 3, multiple electrical resistances 216 are changed in response to changes in the magnetic field 212 and the method includes the step of measuring 218 the voltage across each electrical resistance and averaging 224 the voltages.

The invention is a physical transducer that transforms motion of a magnetic read head sensor 16, 116 and 216 over miniature underlying magnetic domains 12, 112 and 212 resulting in electronic information for sensing and computing physical motion such as linear and/or angular acceleration. The read head sensor 16, 116 and 216 is intended to be of the giant magnetoresistive (GMR) type. GMR sensors, also known as spin valve sensors, detect magnetic areas through changes in the electrical resistance of the sensor influenced by the underlying changes in magnetic field. The GMR sensor head acts as a sliding proof mass that reacts to applied forces from motion and moves over miniature magnetic regions. The slider acts essentially as a mass pressing against a disk under preload force. The slider may be pivoted or unpivoted depending on the required performance parameters and design requirements and may be made to sense different magnitudes of motion forces depending on stress loading, pivoting or other design techniques.

The underlying magnetic regions 12, 112 and 212 are areas that are read during movement of the overlying spin valve sensor 16, 116 and 216. A series of these magnetic domains 12, 112 and 212 can provide sensing regions or counters for the recording head slider that reacts to a mechanical load such as acceleration and or spin angular momentum. Through the use of large changes in the resistance in the spin valve sensor 16, 116 and 216 as it migrates from magnetic domain to domain12, 112 and 212, the sensor 16, 116 and 216 transforms the resistance variations to a varying voltage that is read out with amplification electronics and signal processing. The data output is digital in nature. The stripes 12, 112 and 212 can be encoded for added signal processing discrimination.

The slider body and read head can be made aggressively small and the magnetic regions (bit regions) extremely small, a miniature acceleration and angular rate meter can be designed and fabricated using current state of the art thin film deposition and etching techniques employed in the semiconductor industry.

The acceleration sensed can be either linear or angular in nature depending on the architecture of the proof masses and magnetic stripe layout. FIG. 1 shows the design of an angular acceleration architecture that uses a radial magnetic strip region. As the proof mass reacts to forces imparted due to angular acceleration, the connected read head detects changes in the magnetic field underfoot. FIG. 2 shows a possible design of a linear acceleration sensing architecture, where the proof mass contains the magnetic strip of bits that move past the GMR sensing region under the influence of acceleration forces. FIG. 3 shows a possible design of an array concept of sensing regions where the outputs are summed to provide better sensitivity.

The combination of miniature mechanics and electronics allows the creation of an aggressively miniature integrated physical motion sensor that provides electronic digital output and is amenable to digital signal processing techniques and embedded intelligence. The use of integrated circuit fabrication methodologies allows the use of batch fabrication techniques and permits the creation of inexpensive sensors.

Obviously, many modifications and variations of the present invention are possible in light of the above teachings. The invention may be practiced otherwise than as specifically described within the scope of the appended claims.

What is claimed is:

1. A digital motion detector comprising;

a magnetic element producing a magnetic field, an electrical resistor for changing in electrical resistance in response to changes in the magnetic field produced by said magnetic element, a voltage sensor for sensing the voltage across said electrical resistor, said magnetic element including a strip of magnetic bits providing discrete magnetic regions disposed linearly relative to one another along a path;

said electrical resistor and said magnetic bits being supported for movement relative to one another along said path to produce digital signals from said voltage sensor.

2. An assembly as set forth in claim 1 wherein said strip of magnetic bits is disposed along an arc and said electrical resistor is supported for movement in said arc over said magnetic bits.

3. An assembly as set forth in claim 1 including a plurality of electrical resistors disposed linearly relative to one another and movable together through said magnetic regions for producing the digital signals in response to said voltage sensor.

4. A method of detecting motion and producing a digital signal comprising the steps of;

producing a plurality of discrete regions of magnetic field along a linear path;

changing electrical resistance in response to changes in the magnetic field, and measuring the voltage across the electrical resistance and producing digital signals.

5. A method as set forth in claim 4 including disposing the discrete regions along an arc and moving the electrical resistance in the arc of discrete regions of magnetic field.

6. A method as set forth in claim 4 including moving a plurality of electrical resistances in unison along the path of discrete regions to produce the digital signals in response to changes in the voltage across the electrical resistance.

* * * * *

UNITED STATES PATENT AND TRADEMARK OFFICE
CERTIFICATE OF CORRECTION

PATENT NO.     : 6,633,233 B1
DATED          : October 14, 2003
INVENTOR(S)    : David P. Fries It is certified that error appears in the above-identified patent and that said Letters Patent is hereby corrected as shown below:

Title page,
Item [73], Assignee, delete "University of Florida" and replace with -- University of South Florida --.

Signed and Sealed this

Tenth Day of February, 2004

JON W. DUDAS
*Acting Director of the United States Patent and Trademark Office*